United States Patent [19]

Taylor et al.

[11] 4,233,357

[45] Nov. 11, 1980

[54] LAMINATED INSULATING BOARD

[75] Inventors: Rodney Taylor, Broadway; Robert J. Pragnell; John P. Sheppard, both of Cheltenham, all of England

[73] Assignee: Coal Industry (Patents) Limited, London, England

[21] Appl. No.: 73,026

[22] Filed: Sep. 6, 1979

[51] Int. Cl.[2] .............................................. B32B 5/18
[52] U.S. Cl. ................................... 428/245; 428/246; 428/251; 428/284; 428/285; 428/310; 428/313
[58] Field of Search .............. 428/245, 285, 310, 313, 428/246, 251, 284

[56] References Cited

U.S. PATENT DOCUMENTS

| | | | |
|---|---|---|---|
| 3,968,300 | 7/1976 | Moss et al. | 428/313 |
| 4,028,158 | 6/1977 | Hyschen et al. | 428/313 |

*Primary Examiner*—James J. Bell
*Attorney, Agent, or Firm*—Stevens, Davis, Miller & Mosher

[57] ABSTRACT

An insulating board of excellent properties is made from a core of foamed phenol-formaldehyde resin which has a closed cell content of at least 85%, laminated on at least one face using a water-based natural rubber latex adhesive with a glass fibre tissue or cloth. The laminate has good fire resistance and can be bonded to roofs etc. using hot bitumen.

5 Claims, No Drawings

LAMINATED INSULATING BOARD

This invention concerns a laminated insulation board.

It is known to make insulation boards from foamed plastics, and some of these are laminated with other materials to give properties desirable for use in building or construction work. In particular, it is known to use foamed phenol-formaldehyde boards in roof insulation, but it is believed that commercially available phenol-formaldehyde boards have up to now been of open-cell construction.

The present invention provides a laminated insulating board comprising an insulating core of foamed phenol-formaldehyde resin which has a closed cell content of at least 85% and on at least one face a glass fibre woven or non-woven cloth or tissue laminated to the core with a water-based natural rubber latex adhesive, the laminate having a water absorption of not more than 10% v/v, a thermal conductivity (k-value) of less than 0.035 W/m°C. a flexural strength of at least $50 \times 10^4$ N/m$^2$, a tensile strength of at least $30 \times 10^4$ N/m$^2$, a compressive strength of at least $20 \times 10^4$ N/m$^2$ and a delamination peel strength of at least 200 N/m at room temperature.

It is believed that the combination of properties essential to success in practical usage can only be obtained with a laminate as specified above. It is preferred that the laminate of the invention is a sandwich form, in that it is laminated with glass fibre on two opposing major faces.

The core of foamed phenol-formaldehyde may be manufactured without difficulty; several manufacturers sell phenol-formaldehyde resoles which are intended for foaming. A blowing agent, such as a "Freon" blowing agent, is conventionally used, as is a hardener, such as an acid, e.g. hydrochloric acid. It is advantageous to use a cell control agent, and a silicone oil surfactant may be used. As has been stated above, a very high closed cell content is believed essential, and manufacture may be controlled in known manner to achieve this.

The glass fibre cloth or tissue is preferably a non-woven tissue, which is commercially available. The preferred tissue has a thickness of 0.25 to 0.60 mm, a weight of 40 to 80 g/m$^2$ and a tensile strength of 15 to 40 N/m$^2$. The tissue improves the strength and the dimensional stability of the insulating board, yielding results in combination with the rubber adhesive which are unexpectedly good.

The natural rubber latex adhesive may be thickened to a convenient viscosity (e.g. to 5,000–15,000 cps at 20° C. for application using a roller coater applicator) using a polyacrylate thickening agent. Since insulation boards are frequently exposed to damp, for example from condensation, it is preferred to incorporate a fungicide to prevent fungal growth and possible loss of strength. Also, since the insulation boards of the invention may be exposed to high temperatures, by reason of their being applied to a structure using molten bitumen (at about 150° C.) or because of solar gain, it is preferred to stabilise the natural rubber adhesive with the addition of an anti-oxidant. This adhesive gives a high bond strength between the phenolic foam core, which is of low density, dusty and friable, and the glass fibre cloth or tissue. The bond has to withstand wind suction on flat roofs in severe gales, and it has been found that a minimum peel strength of 200 N/m is required. In addition, this adhesive exhibits minimum degradation at temperature extremes of $-10°$ C. and $+90°$ C. and is substantially unaffected by moisture and dilute acids; it also withstands contact with holt melt bitumen and asphalt at temperatures up to 250° C.

The insulating boards according to the invention find especial use in insulating roofs, and may be applied to new or existing roofs, whether of concrete, timber or metal and are applied before waterproofing with built up felt, asphalt or single layer roofing materials. When so applied, the insulated and waterproofed roof can withstand maintenance foot traffic.

The invention will now be illustrated by means of an example.

A phenol formaldehyde resole resin of low reactivity and low free phenol content, having a specific gravity of 1.20 to 1.25 g/cc and a viscosity at 20° C. in the range 3,000 to 6,000 cps, is thoroughly mixed in a batch with a surfactant such as a long chain fatty acid or a silicone, an acid hardener (conveniently hydrochloric acid or p-toluene sulphonic acid) and a low boiling point liquid blowing agent, such as pentane or trichlorofluoromethane. The proportions of the ingredients are:

| | |
|---|---|
| P/F resin | 30 Kg |
| Surfactant | 0.3 Kg |
| Hydrochloric Acid | 3 Kg |
| Pentane | 2 liters. |

The batch mixture is poured into a mould of dimensions 1.25 m $\times$ 0.65 m $\times$ 1 m which is then heated at 40°–50° C. for 3–4 hours. The batch foams and hardens, and the foam block resulting is removed from the mould and allowed to cool for 2 days. The block is then cut into panels or boards of size 1.2 m $\times$ 0.6 m $\times$ 25 mm. The dry foam density is 35–40 Kg/m$^3$.

A thickened natural rubber adhesive, having a viscosity in the range 5,000–15,000 cps at 20° C. is applied on both major sides of individual foam boards by a roller coater. To the adhesive is applied a glass fibre non-woven tissue of 0.40 mm thickness, 60 g/m$^2$ weight and having a tensile strength of $25 \times 10^2$ N/m, to give a laminated foam board.

The laminated board was tested for physical properties in comparison with an unlaminated board.

| Test | Foam Board | Laminated Board |
|---|---|---|
| Compressive Strength/Puncture (1) (N/m$^2$) | $22 \times 10^4$ | $22 \times 10^4$ |
| Puncture Resistance (1) (N/m$^2$) | Not Applicable | $43 \times 10^4$ |
| Flexural Strength (1) (N/m$^2$) | $30 \times 10^4$ | $60 \times 10^4$ |
| Tensile Strength (1) (N/m$^2$) | $18 \times 10^4$ | $35 \times 10^4$ |
| Dimensional Stability (2) (%) | | |
| at 50° C. | $-0.1$ | $+0.02$ |
| 70° C. | $-0.5$ | $+0.02$ |
| 90° C. | $-0.6$ | $-0.04$ |
| 50° C./100% relative humidity | $-0.1$ | $-0.02$ |
| Total Shrinkage, 24 hrs @ 70° C. (1) | 0.7 | 0.1 |
| Laminate Flexing test (3) | | |
| at 0° C. (delamination) | — | None |
| at 20° C. (delamination) | — | None |
| Foam Porosity | | |
| Water absorption (3) (% v/v) | — | 7.8 |
| Vapour transmission (4) perm/inch | — | 1.9 |
| Peel Strength (5) (N/m) | | |
| At Ambiant Temp. | — | 220 |
| After 30 days at $-10°$ C. | — | 215 |
| 30 days cycle test (6) | — | 227 |
| After 30 days at 90° C. | — | 60 |

| Test | Foam Board | Laminated Board |
| --- | --- | --- |
| ditto, using antioxidant in adhesive | — | 180 |

Notes:
(1) Tests from British Standards (BS) 3927 and 4370.
(2) BS 3927, modified to include greater number of temperatures
(3) Test devised by inventors
(4) BS 2972
(5) ASTM D773-47
(6) 24 hrs. at 90° C., 24 hrs. at 50° C./100% RH and 24 hrs. at −10° C., for total period of 30 days.

It will be readily seen from the above that the laminated board according to the invention shows significantly superior properties to those of the unlaminated board, and the improvement is greater than could be expected from a consideration solely of the properties of the glass fibre tissue.

In addition, the phenolic foam according to the invention shows very good resistance to heat and fire. It will char rather than burn. Unlike many insulating plastics foams, it will not melt or produce dense smoke, nor will it give off amines, cyanides, sulphur dioxide or other toxic gases. Tested according to BS 476 for surface spread of flame, it achieved a nil flame spread (Class 1) and tested for ignitability it achieved the highest rating available (not easily ignitable).

Clearly, the thickness of the board, and other dimensions, can be varied according to the requirements of the user.

We claim:

1. A laminated insulating board comprising an insulating core of foamed phenol-formaldehyde resin which has a closed cell content of at least 85% and on least one face of said core a glass fibre woven or non-woven cloth or tissue laminated to the core with a water-based natural rubber latex adhesive, the laminate having a water absorption of not more than 10% v/v, a thermal conductivity (k-value) of less than 0.035 W/m°C., a flexural strength of at least $50 \times 10^4$ N/m$^2$, a tensile strength of at least $30 \times 10^4$ N/m$^2$, a compressive strength of at least $20 \times 10^4$ N/m$^2$ and a delamination peel strength of at least 200 N/m at room temperature.

2. A board as claimed in claim 1, wherein the core is laminated with the glass fibre tissue or cloth on two opposing major faces.

3. A board as claimed in claim 2, wherein a glass fibre non-woven tissue is used.

4. A board as claimed in claim 3, wherein the tissue has a thickness of 0.25 to 0.60 mm, a weight of 40 to 80 g/m$^2$ and a tensile strength of 15 to 40 N/m$^2$.

5. A board as claimed in claim 1, wherein the adhesive comprises a fungicide and an anti-oxidant.

* * * * *